UNITED STATES PATENT OFFICE.

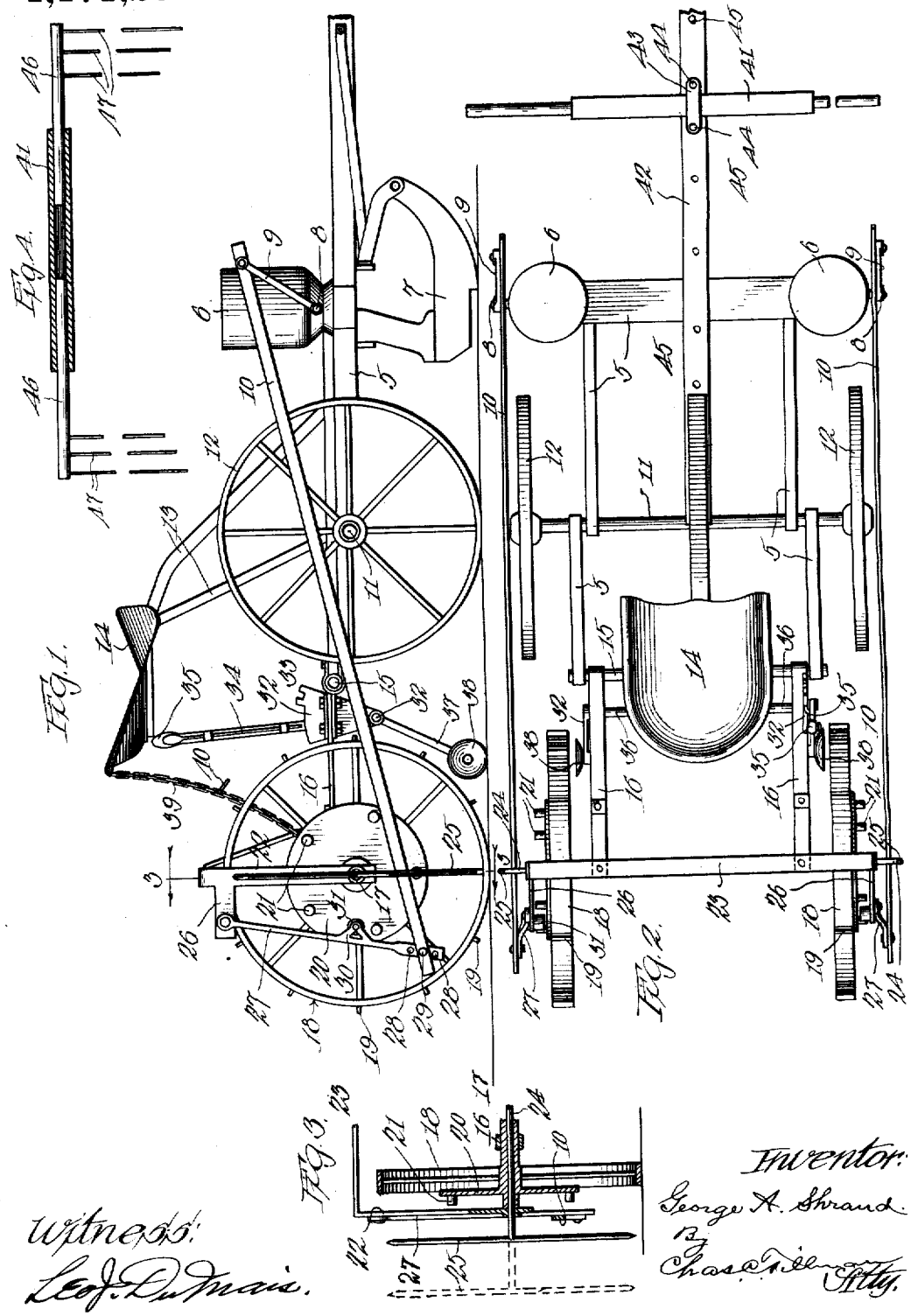

GEORGE A. SHRAUD, OF CHICAGO, ILLINOIS.

ATTACHMENT FOR CORN-PLANTERS.

1,171,265.      Specification of Letters Patent.      Patented Feb. 8, 1916.

Application filed September 27, 1915. Serial No. 52,758.

*To all whom it may concern:*

Be it known that I, GEORGE A. SHRAUD, a citizen of the United States, residing at Chicago, in the county of Cook and State of Illinois, have invented certain new and useful Improvements in Attachments for Corn-Planters, of which the following is a specification.

This invention relates to improvements in corn planters, and it consists in certain peculiarities of the construction, novel arrangement and operation of the various parts thereof, as will be hereinafter more fully set forth and specifically claimed.

The invention comprehends improvements in seed-planters, and relates more particularly to those which are especially adapted for planting corn in check rows, and the principal object thereof is to provide an attachment for corn-planters of the ordinary, or any preferred construction, which shall be simple and inexpensive in construction, strong, durable and efficient in operation, and so made that it can be readily attached to the frame of the planter proper, so as to trail therewith and to be readily operated by the driver or operator of the planter.

Another important object of the invention is to provide means for indicating to the operator the points at which the corn or seed is being dropped or planted, to the end, that he may know whether or not it is being deposited in alined cross or intersecting rows with the primary or leading rows.

A further object is to provide means for automatically and more perfectly covering the corn or seed after it has been deposited from the shoes or furrow-openers of the planter proper.

A still further object is to furnish simple and effective means for placing said covering means or the marking and indicating means, in inoperative positions, either singly or simultaneously.

Still another object is to provide an improved and novel mechanism for actuating the valve or valves of the hopper or hoppers of the planter.

Other objects and advantages of the invention will be disclosed in the subjoined description and explanation.

In the accompanying drawing, which serves to illustrate an embodiment of the invention—Figure 1 is a view in side elevation of a corn planter showing my improvements attached thereto. Fig. 2 is a plan view thereof and Fig. 3 is a fragmental sectional view taken on line 3—3 of Fig. 1 looking in the direction indicated by the arrows, and showing by dotted lines one of the positions to which the indicator may be extended, and Fig. 4 is a detached view, partly in section and partly in elevation, of the auxiliary indicator.

Like numerals of reference refer to corresponding parts throughout the different views of the drawing.

The reference numeral 5 designates the main frame of the planter, on the front portion of which frame is mounted at each side thereof a hopper 6 for the reception and retention of the corn or seed to be planted. Communicating with each of the hoppers 6 and depending from the frame 5 of the planter, is a foot 7 of the ordinary or any well known construction through which the grain is passed into the furrows in the usual manner. Each of the hoppers 6 is provided in its lower portion with a rotary valve stem 8 which operates a valve, (not shown) located within the hopper and used for regulating the discharge of the grain or seed therefrom. As these valves may be of any desired construction and operation, and as they form no part of my invention, it is not deemed necessary to illustrate or describe them in detail. Extended upwardly from each of the valve stems 8 is a rod or arm 9, the upper end of each of which is pivotally connected to a bar or rod 10 near the front end thereof. Transversely journaled on the frame 5 is an axle 11 which has mounted on each of its ends a traction wheel 12 of any desired construction. Extended upwardly and rearwardly from the frame 5 are braces 13 which support at their upper portions a seat 14 for the driver or operator of the planter. Transversely mounted on the rear portion of the frame 5 and forming a part thereof is a rod or bar 15 to which are pivotally secured near the ends thereof, the front ends of straps or bars 16 which constitute a part of the frame of my improved attachment. Rotatably and transversely mounted on the rear portion of the members 16 is a hollow shaft 17 which has fixed thereto near each of its ends a marker wheel 18 each of which is provided on its periphery with a number of markers 19, which may be in the form of transversely disposed cleats or otherwise. Each of the wheels 18 has surrounding its hub and located on the outer portion thereof a disk 20 each of which is provided near its periphery with a number of pins or projections 21 which extend outwardly as is clearly shown in the different views of the drawing. Extended upwardly from each end of the hollow shaft 17 is a standard 22 which are connected at their upper portions by means of a transverse piece or bar 23 which bar, with said standards, comprise a portion of the frame of the attachment.

As will be seen and understood by reference to Fig. 3, the ends of the shaft or axle 17 are journaled in the lower ends of the standards 22 and in such a way as to permit said axle to turn in its bearings and in unison with the wheels 18 and disks 20 carried by said wheels. Inserted into the cavity of the shaft or axle 17, at each end thereof is a rod 24 which has on its outer end an indicator 25 disposed at a right angle to said rod, which rod is frictionally held within the shaft 17 but so that it may be slid inwardly or outwardly with respect thereto. At its upper portion each of the standards 22 has a rearwardly extended arm 26 to each of which is pivotally connected at its upper end a link or bar 27 which is provided at its lower end with a series of openings 28 for the reception of a pin 29 which is extended through a suitable opening in the rear end of the bar 10, and is used for pivotally and adjustably connecting said bar and the link 27 together. At a suitable point between its ends the link 27 is provided with a bracket 30 on which is journaled a roller 31 adapted for contact with the pins or projections 21 in the revolution of the wheels 18 and disks 20 thereon. Mounted on each of the members 16 and near the front end thereof is an upright bracket or plate 32 one of which is provided at its upper portion with a recess 33 to engage the latch lever 34 of a lever 35 which is secured at its lower end to a rod 36 which is transversely journaled in the lower ends of the brackets 32 as is clearly shown in Fig. 1 of the drawing. Extended downwardly from each end of the rod 36 is an arm 37 each of which has journaled on its lower portion a disk 38 used to more perfectly cover the corn or seed after it has been dropped. Connected at one of its ends to the seat 14 is a loose or flexible connection 39, such as a chain, which has its other end connected to the axle 17. This connection or chain is used to raise the attachment frame from the ground, when desired, and it is evident that this can be done by drawing the chain upwardly until the wheels 18 are removed from the earth in which position it can be held by engaging the hook 40 with one of the upper links of the chain 39 or flexible connection. If it is desired to throw the disks 38 out of their operative positions, it is evident that by moving the lever 35 forwardly the disks 38 will be raised rearwardly in which position they may be held by permitting the latch rod 34 to engage the recess 33 of one of the brackets 32.

In the operation of planting, as the planter travels over the ground, the marker wheels as well as their disks, will of course, rotate, which will cause the pins or projections 21, on said disks to successively contact with the rollers 31 on the links 27, and as said links are connected by means of the bars 10, to the arms 9, of the hopper-valves, said arms will be caused to oscillate and discharge the corn into the shoes 7, thus planting the grain in two parallel rows, which grain may be covered in the well known or usual way, or if desired, the disks 38, may be employed for more perfectly or completely covering the same, as it is obvious they are located so as to travel along and a little to one side of the rows in which the corn has been dropped. After two rows have been planted, the planter is turned around at the ends of said rows and located at the proper position to plant two more rows in parallelism with the other rows. Now, in planting the first named rows, the depressions in the ground produced by the markers 19, on the wheels 18, will indicate where the corn has been planted, and in order to locate the "hills" or points of planting of the check or cross-rows so that said "hills" will aline with one another, it is only necessary to so place the planter, that the indicator 25, on the wheel adjacent to the planted rows, will indicate or point to a spot in transverse alinement with two of the planted "hills," or two of the places where corn has been planted and drive the machine in parallelism with the planted rows. As the indicators 25 will rotate with the axle 17, and wheels 18, and as they are adjustably mounted on said axle, it is apparent that they can be adjusted to proper distances from said wheels so as to be seen by the operator under different conditions and will at all times indicate whether or not the planting is being done in alinement.

It will be understood that while I have shown and described one embodiment of my invention, I do not wish to be limited to this exact construction, combination, and arrangement of parts, but may make such changes as will fall within the spirit and scope of the invention as claimed, the principal and important novel feature of the invention consisting broadly in the provision of a trailing attachment for corn planters having means operable with the seed dropping mechanism of the planter to indicate whether or not the seed is being deposited in alined cross-rows with the primary rows.

Transversely mounted on the planter frame at any suitable point in front of my attachment, is an auxiliary indicator, the purpose of which is to indicate the starting point on the return trip. This auxiliary indicator consists of a tube 41 which is secured transversely on the planter, and in the present instance is shown as being located on the pole 42 of the planter, to which pole the tube 41 is secured by means of a strap 43 and bolts 44, the latter being extended through suitable openings 45 therein, in the pole. A number of openings 45 are employed so that the tube 41 may be adjusted to any suitable position on the planter. Fitted in each end of the tubes 41 and frictionally held therein is a rod 46, to the outer portion of each of which is secured a number of depending strings or cords 47 which extend to or near the ground. On the return trip of the machine, these strings should be located in alinement with the last cross row of "hills" before the machine is started, and as the auxiliary indicator 41 is located at a predetermined point in advance of the indicator 25, so that when the last named indicator has made a sufficient movement or rotation in the forward movement of the machine, that it will point to the initial place of the auxiliary indicator, it is obvious that the starting point on the return trip will be indicated.

Having thus fully described my invention, what I claim as new and desire to secure by Letters Patent is—

In a corn planter, the combination with a main wheeled frame, of a hopper and seed dropping mechanism mounted thereon and including a rotatable valve rod, an arm rigid with said rod, an auxiliary frame attached to the rear portion of the first named frame, an axle transversely journaled on said auxiliary frame, a wheel rigidly mounted on said axle near each of its ends, one of the wheels of the last named frame having markers and outwardly extended projections, said projections located around the hub of the wheel, a rod longitudinally and adjustably mounted in said axle and extended from one end of the same, an indicator on the outer end of said rod, a link pivoted to the upper portion of the auxiliary frame and having means to contact with said projections, and a connection uniting the lower portion of said link and said valve rod.

GEORGE A. SHRAUD.

Witnesses:
CHAS. C. TILLMAN,
A. E. OLSON.

Copies of this patent may be obtained for five cents each, by addressing the "Commissioner of Patents, Washington, D. C."